US012595389B2

(12) United States Patent
Oliveira et al.

(10) Patent No.: US 12,595,389 B2
(45) Date of Patent: Apr. 7, 2026

(54) MULTILAYER STRUCTURES AND ARTICLES WITH COATING LAYERS

(71) Applicant: Dow Global Technologies LLC, Midland, MI (US)

(72) Inventors: Marlos Giuntini De Oliveira, Sao Paulo (BR); Michael B. Biscoglio, Blue Bell, PA (US); Jorge Caminero Gomes, Sao Paulo (BR); Camila Do Valle, Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 331 days.

(21) Appl. No.: 18/246,080

(22) PCT Filed: Nov. 16, 2021

(86) PCT No.: PCT/US2021/059513
§ 371 (c)(1),
(2) Date: Mar. 21, 2023

(87) PCT Pub. No.: WO2022/108923
PCT Pub. Date: May 27, 2022

(65) Prior Publication Data

US 2023/0365827 A1 Nov. 16, 2023

Related U.S. Application Data

(60) Provisional application No. 63/116,251, filed on Nov. 20, 2020.

(51) Int. Cl.

| | |
|---|---|
| ***C09D 123/06*** | (2006.01) |
| ***B32B 27/10*** | (2006.01) |
| ***B32B 27/32*** | (2006.01) |
| ***C09D 7/63*** | (2018.01) |

(52) U.S. Cl.
CPC ............ *C09D 123/06* (2013.01); *B32B 27/10* (2013.01); *B32B 27/32* (2013.01); *C09D 7/63* (2018.01); *B32B 2250/02* (2013.01); *B32B 2270/00* (2013.01); *B32B 2307/72* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 5,923,136 | A | 7/1999 | Cegelec | |
| 8,653,196 | B2 | 2/2014 | Mazzola et al. | |
| 8,664,337 | B2 | 3/2014 | Mazzola et al. | |
| 9,714,326 | B2 | 7/2017 | Demirors et al. | |
| 2014/0148535 | A1 | 5/2014 | Kapur et al. | |
| 2015/0267036 | A1 * | 9/2015 | Cree ........................ | C08K 5/01 524/585 |
| 2019/0100644 | A1 | 4/2019 | Williamson et al. | |
| 2019/0225786 | A1 | 7/2019 | Yang et al. | |
| 2020/0239673 | A1 | 7/2020 | Ssubramaniam et al. | |

FOREIGN PATENT DOCUMENTS

| | | |
|---|---|---|
| EP | 0792318 | 9/1997 |
| WO | 2011085371 | 7/2011 |
| WO | 2017172273 | 10/2017 |
| WO | 2018118362 | 6/2018 |
| WO | 2019022974 | 1/2019 |
| WO | 2019067239 | 4/2019 |

OTHER PUBLICATIONS

Di-Cup® Dicumyl Peroxide Technical Information sheet (Year: 2025).*
Wu et al., Journal of Thermal Analysis and Calorimetry, vol. 83, pp. 41-44 (Year: 2006).*
Dow Dow™ 4016 LDPE data sheet (Year: 2025).*
Dow Dow™ 6211 LDPE data sheet (Year: 2025).*
PCT/US2021/059513, International Search Report and Written Opinion with a mailing date of Feb. 14, 2022.

* cited by examiner

*Primary Examiner* — Ramsey Zacharia
(74) *Attorney, Agent, or Firm* — Jacob R. Graham

(57) ABSTRACT

Provided are multilayer structures as well as articles formed therefrom. A multilayer structure according to embodiments disclosed herein comprises a substrate layer and a coating layer, wherein the substrate layer is coated with the coating layer. The coating layer comprises a blend of a high-pressure low density polyethylene and a masterbatch composition. When the coating layer is coated onto the substrate layer, the coating layer can have an improved neck-in reduction and maintenance or improvement in drawdown during processing.

9 Claims, No Drawings

MULTILAYER STRUCTURES AND ARTICLES WITH COATING LAYERS

TECHNICAL FIELD

The present invention relates to multilayer structures comprising a substrate layer and coating layer, to articles comprising such multilayer structures, and to methods for making such multilayer structures.

INTRODUCTION

Multilayer structures that include an extrusion coated substrate (i.e., a substrate layer that is coated with a coating layer) are widely used in packaging applications. To make such structures, a polyolefin coating can be adhered to or coated onto a substrate via extrusion coating. The coating, when added to a substrate layer, can improve or impart desirable properties (e.g., barrier, sealing, and toughness properties). Challenges exist, however, in producing and manufacturing extrusion coated substrates. For example, low density polyethylenes are often used as the polyolefin coating due to their high melt strength and presence of long chain branching. Extrusion coating a low density polyethylene onto a substrate (e.g., a film), however, can result in increased neck-in when manufacturing lines are running at their highest targeted speeds. Accordingly, there remains a need for multilayer structures including coating layer and resin designs that exhibit decreased neck-in while maintaining or improving drawdown performance.

SUMMARY

The present invention provides multilayer structures that comprise a substrate layer and a coating layer, where the substrate layer is coated with the coating layer. According to embodiments, the coating layer includes a polyethylene composition that comprises a high-pressure low density polyethylene and a masterbatch composition, and when the coating layer is coated onto a substrate layer, the coating layer can exhibit desirable properties, such as a reduction of neck-in with maintained or improved drawdown.

In one aspect, the present invention provides a multilayer structure that comprises (a) a substrate layer comprising a substrate; and (b) a coating layer comprising a polyethylene composition that comprises (i) a high-pressure low density polyethylene having a density in the range of from 0.916 g/cm$^3$ to 0.940 g/cm$^3$, a melt index (12) in the range of from 2.0 to 30.0 g/10 min, and less than 0.20 vinyl groups per 1,000 total carbon atoms; and (ii) a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/cm$^3$ to 0.970 g/cm$^3$, melt index in the range of from 0.01 g/10 min to 100 g/10 min; wherein the substrate layer is coated with the coating layer.

In another aspect, the present invention provides an article, such as a package, comprising any of the inventive multilayer structures disclosed herein.

In another aspect, the present invention provide a method for forming the inventive multilayer structure, the method comprising: (a) providing a high-pressure low density polyethylene having a density in the range of from 0.916 g/cm$^3$ to 0.940 g/cm$^3$, a melt index ($I_2$) in the range of from 2.0 to 30.0 g/10 min, and less than 0.20 vinyl groups per 1,000 total carbon atoms; (b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/cm$^3$ to 0.970 g/cm$^3$, melt index in the range of from 0.01 g/10 min to 100 g/10 min; (c) reacting the high-pressure low density polyethylene with the masterbatch composition to form a polyethylene composition; and (d) extrusion coating the polyethylene composition as a coating layer onto a substrate layer comprising a substrate to form the multilayer structure.

These and other embodiments are described in more detail in the Detailed Description.

DETAILED DESCRIPTION

Aspects of the disclosed multilayer structures, articles, and methods for making the multilayer structures are described in more detail below. This disclosure, however, should not be construed to limit the embodiments set forth below.

As used herein, the term “polymer” means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the terms “polyethylene” or “ethylene-based polymer” shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE).

As used herein, the term “high-pressure low density polyethylene” shall mean a polyethylene that is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). As used herein, a high-pressure low density polyethylene has a density in the range of from 0.916 g/cm$^3$ to 0.940 g/cm$^3$.

As used herein, the term “multilayer structure” refers to any structure having more than one layer. For example, a multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D. Multilayer structures disclosed herein include structures comprising a coating layer and a substrate layer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

In embodiments, the present invention provides a multilayer structure that comprises (a) a substrate layer comprising a substrate; and (b) a coating layer comprising a polyethylene composition that comprises (i) a high-pressure low density polyethylene having a density in the range of from 0.916 g/$cm^3$ to 0.940 g/$cm^3$, a melt index (12) in the range of from 2.0 to 30.0 g/10 min, and less than 0.20 vinyl groups per 1,000 total carbon atoms; and (ii) a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/$cm^3$ to 0.970 g/$cm^3$, melt index in the range of from 0.01 g/10 min to 100 g/10 min; wherein the substrate layer is coated with the coating layer. Without wishing to be bound by any particular theory, it is believed that the blend of a specific high-pressure low density polyethylene with a specific masterbatch composition having a free radical generator contributes to neck-in reduction and maintained or improved drawdown when compared to multilayer structures including a coating layer without the blend and with low density polyethylene or linear low density polyethylene.

A multilayer structure of the present invention can comprise a combination of two or more embodiments described herein.

In other embodiments, the present invention relates to an article, such as a package. In embodiments, an article comprises any of the inventive multilayer structures disclosed herein. An article of the present invention can comprise a combination of two or more embodiments as described herein.

Substrate Layer

Multilayer structures of the present invention comprise a substrate layer comprising a substrate. A coating layer is applied to the substrate layer (i.e., the substrate layer is coated with the coating layer) using techniques known in the art such as extrusion coating.

In embodiments, the substrate of the substrate layer can comprise at least one of a film, nonwoven, woven, scrim, foil, carpet, plastic, saran, paper, cellulose, or metal.

Coating Layer

Multilayer structures of the present invention comprise a coating layer. The coating layer comprises a polyethylene composition. The polyethylene composition comprises (i) a high-pressure low density polyethylene having a density in the range of from 0.916 g/$cm^3$ to 0.940 g/$cm^3$, a melt index (12) in the range of from 2.0 to 30.0 g/10 min, and less than 0.20 vinyl groups per 1,000 total carbon atoms; and (ii) a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/$cm^3$ to 0.970 g/$cm^3$ and melt index (12) in the range of from 0.01 g/10 min to 100 g/10 min. The multilayer structure includes a coating layer that enhances neck-in reduction and maintains or improves drawdown.

The polyethylene composition comprises a high-pressure low density polyethylene. In embodiments, the polyethylene composition comprises from 90 to 99.5 weight percent (wt. %) of the high-pressure low density polyethylene and from 0.5 to 10 wt. % of the masterbatch composition. All individual values and subranges of from 90 to 99.5 wt. % of the high-pressure low density polyethylene are disclosed and incorporated herein. For example, the polyethylene composition can comprise from 90 to 99.5 wt. %, from 92 to 99.5 wt. %, from 95 to 99.5 wt. %, or from 96 to 99.5 wt. % of the high-pressure low density polyethylene, where weight percent (wt. %) is based on total weight of the polyethylene composition. Likewise, all individual values and subranges of from 0.5 to 10 wt. % of the masterbatch composition are disclosed and incorporated herein. For example, the polyethylene composition can comprise from 0.5 to 10 wt. %, from 0.5 to 8 wt. %, from 0.5 to 5 wt. %, or from 0.5 to 4 wt. % of the masterbatch composition, where weight percent (wt. %) is based on total weight of the polyethylene composition.

In embodiments, the high-pressure low density polyethylene of the polyethylene composition has a density from 0.916 g/$cm^3$ to 0.940 g/$cm^3$. All individual values and subranges of from 0.916 g/$cm^3$ to 0.940 g/$cm^3$ are disclosed and included herein. For example, the high-pressure low density polyethylene can have a density of from 0.916 g/$cm^3$ to 0.940 g/$cm^3$, from 0.916 g/$cm^3$ to 0.935 g/$cm^3$, 0.916 g/$cm^3$ to 0.930 g/$cm^3$, 0.916 g/$cm^3$ to 0.925 g/$cm^3$, or from 0.916 g/$cm^3$ to 0.920 g/$cm^3$.

In embodiments, the high-pressure low density polyethylene of the polyethylene composition has a melt index (12) in the range of from 2.0 to 30.0 g/10 min. All individual values and subranges of from 2.0 to 30.0 g/10 min are disclosed and included herein. For example, the high-pressure low density polyethylene can have a melt index ($I_2$) in the range of from 2.0 to 30.0 g/10 min, from 2.0 to 20 g/10 min, or from 0.2 to 10 g/10 min.

In embodiments, the high-pressure low density polyethylene of the polyethylene composition has less than 0.20 vinyl groups per 1,000 total carbon atoms. All values and subranges of less than 0.20 vinyl groups per 1,000 total carbon atoms are disclosed and included herein. For example, the high-pressure low density polyethylene can have less than 0.20 vinyl groups per 1,000 total carbon atoms, less than 0.18 vinyl groups per 1,000 total carbon atoms, less than 0.16 vinyl groups per 1,000 total carbon atoms, less than 0.14 vinyl groups per 1,000 total carbon atoms, less than 0.12 vinyl groups per 1,000 total carbon atoms, less than 0.10 vinyl groups per 1,000 total carbon atoms, less than 0.08 vinyl groups per 1,000 total carbon atoms, or less than 0.06 vinyl groups per 1,000 total carbon atoms, where vinyl unsaturation can be measured in accordance with the test method described below.

In embodiments, the high-pressure low density polyethylene can be polymerized in an autoclave reactor. In other embodiments, the high-pressure low density polyethylene can be polymerized in a tubular reactor.

Examples of high-pressure low density polyethylenes that can be used in the polyethylene composition of the coating layer in some embodiments include DOW™ LDPE 772 and AGILITY™ (e.g., AGILITY™ EC7000 and AGILITY™ EC7080) high-pressure low density polyethylenes commercially available from The Dow Chemical Company (Midland, MI).

The polyethylene composition comprises a masterbatch composition that comprises a free radical generator and a polyethylene resin. In embodiments, the free radical generator has a half-life at 220° C. of less than 200 seconds and a decomposition energy higher than (i.e., more negative than) −250 kJ/mol. In some embodiments, the free radical generator has a half-life at 220° C. of less than 175 seconds, 150 seconds, or 125 seconds. In other embodiments, the free radical generator has a half-life at 220° C. of from 60 to 200 seconds, 60 to 175 seconds, 60 to 150 second, 60 to 125 seconds, or 60 to 120 seconds.

In embodiments, the free radical generator may have a molecular weight from 200 to 1,000 Daltons. All individual values and subranges of from 200 to 1,000 Daltons are included and disclosed herein. For example, in some embodiments, the free radical generator may have a molecular weight from 225 to 1000, 250 to 1000, or 250 to 700.

In embodiments, the free radical generator is present in an amount ranging from 5 ppm to 1000 ppm relative to the total amount of polyethylene resin. All individual values and subranges from 5 to 1,000 ppm are included herein and disclosed herein; for example, the amount of free radical generator relative to the total amount of polyethylene resin may range from a lower limit of 5, 10, 20, 30, 50, 80, 100, 200, 300, 400, 500, 600, 700, 800 or 900 ppm to an upper limit of 15, 25, 30, 35, 50, 60, 65, 75, 100, 150, 250, 350, 450, 550, 650, 750, 850, 950 or 1000 ppm.

In embodiments herein, the free radical generator may be a cyclic peroxide. An example of a suitable cyclic peroxide may be represented by the formula:

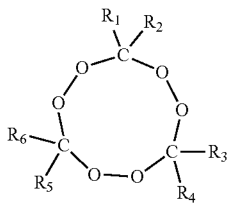

wherein R1-R6 are independently hydrogen or an inertly-substituted or unsubstituted C1-C20 alkyl, C3-C20 cycloalkyl, C6-C20 aryl, C7-C20 aralkyl, or C7-C20 alkaryl. Representative of the inert-substituents included in R1-R6 are hydroxyl, C1-C20 alkoxy, linear or branched C1-C20 alkyl, C6-C20 aryloxy, halogen, ester, carboxyl, nitrile, and amido. In some embodiments, R1-R6 are each independently lower alkyls, including, for example, C1-C10 alkyl, or C1-C4 alkyl.

Some of the cyclic peroxides as described herein are commercially available, but otherwise can be made by contacting a ketone with hydrogen peroxide as described in U.S. Pat. No. 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley-Interscience, New York (1970); and Houben-Weyl Methoden der Organische Chemie, El 3, Volume 1, page 736.

Examples of the other cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone and methylundecyl ketone. The cyclic peroxides can be used alone or in combination with one another.

In some embodiments, the cyclic peroxide may be 3,6,9-triethyl-3-6-9-trimethyl-1,4,7-triperoxonane, which is commercially available from AkzoNobel under the trade designation TRIGONOX 301. The cyclic peroxide used herein can be liquid, solid, or paste depending on the melting point of the peroxide and the diluent, if any, within which it is carried.

The polyethylene resin of the masterbatch composition has a density in the range of from 0.900 g/cm$^3$ to 0.970 g/cm$^3$ and a melt index ($I_2$) in the range of from 0.01 g/10 min to 100 g/10 min. All individual values and subranges of a density ranging from 0.900 g/cm$^3$ to 0.970 g/cm$^3$ and a melt index ranging from 0.01 g/10 min to 100 g/10 min are included and disclosed herein. For example, in some embodiments, the density ranges from a lower limit of 0.900, 0.902, 0.905, 0.907, 0.910, 0.912, 0.915, 0.920, 0.925, 0.930, 0.935, or 0.940 g/cm$^3$ to an upper limit of 0.970, 0.965, 0.960, 0.955, 0.950, 0.945, 0.942, 0.940, 0.937, 0.935, 0.930, 0.927, 0.925, 0.922, or 0.920 g/cm$^3$. In other embodiments, the density ranges from 0.905 g/cm$^3$ to 0.965 g/cm$^3$, 0.905 g/cm$^3$ to 0.960 g/cm$^3$, 0.907 g/cm$^3$ to 0.960 g/cm$^3$, 0.910 g/cm$^3$ to 0.955 g/cm$^3$, 0.910 g/cm$^3$ to 0.950 g/cm$^3$, 0.910 g/cm$^3$ to 0.947 g/cm$^3$, 0.910 g/cm$^3$ to 0.945 g/cm$^3$, 0.910 g/cm$^3$ to 0.9420 g/cm$^3$, or 0.910 g/cm$^3$ to 0.940 g/cm$^3$. For example, in some embodiments, the melt index (12) ranges from a lower limit of 0.01, 0.05, 0.1, 0.5, 1, 3, 5, 7, 10, 12, 15, 18, 20, 23, 25, 30, 35, 40, 45, 50, 55, 60, 65, 70, 75, 80, 85, or 90 to an upper limit of 100, 95, 90, 85, 80, 75, 70, 65, 60, 55, 50, 45, 40, 35, 30, 27, 25, 22, 20, 17, 15, 12, 10, 8, 5, 2, 1, 0.9, 0.7, or 0.5. In other embodiments, the melt index ($I_2$) ranges from 0.05 g/10 min to 30 g/10 min, 0.1 g/10 min to 30 g/10 min, 0.1 g/10 min to 25 g/10 min, 0.1 g/10 min to 20 g/10 min, 0.1 g/10 min to 18 g/10 min, 0.1 g/15 min to 30 g/10 min, 0.25 g/10 min to 15 g/10 min, 0.25 g/10 min to 12 g/10 min, 0.25 g/10 min to 10 g/10 min, 0.25 g/10 min to 8 g/10 min, 0.25 g/10 min to 5 g/10 min.

The polyethylene resin may be a low density polyethylene (LDPE), a linear low density polyethylene (LLDPE), a medium density polyethylene (MDPE), a high density polyethylene (HDPE), or combinations thereof. In some embodiments, the polyethylene resin is a LDPE. In other embodiments, the polyethylene is a LLDPE. In further embodiments, the polyethylene is a MDPE or a HDPE.

In embodiments herein where the polyethylene resin is a LLDPE, the LLDPE may be a homogeneously branched or heterogeneously branched and/or unimodal or multimodal (e.g., bimodal) polyethylene. The linear low density polyethylene comprises ethylene homopolymers, interpolymers of ethylene and at least one comonomer, and blends thereof. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. Examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or U.S. Pat. No. 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049G, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™ SC74836 resins; linear low density polyethylene resins sold by LyondellBasell Industries, including, for example, PETROTHENE™ GA501 and LP540200 resins, and ALATHON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by *Borealis* AG, including, for example, BORSTAR™ FB 2310 resin.

In embodiments herein where the polyethylene resin is a MDPE, the MDPE may be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the MDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene. The MDPE may have a density of from 0.923 g/$cm^3$ and 0.935 g/$cm^3$. All individual values and subranges are included and disclosed herein.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, TX), such as, PETROTHENE™ L3035, ENABLE™ resins sold by The ExxonMobil Chemical Company (Houston, TX), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

In embodiments herein where the polyethylene resin is a HDPE, the HDPE may also be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the HDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure. The HDPE may have a density of from 0.935 g/$cm^3$ and 0.975 g/$cm^3$. All individual values and subranges are included and disclosed herein.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, MI), L5885 and M6020 HDPE resins from Equistar Chemicals, LP, ALATHON™ L5005 from LyondellBasell Industries (Houston, TX), and MARFLEX™ HDPE HHM TR-130 from Chevron Phillips Chemical Company LP. Other exemplary HDPE resins are described in U.S. Pat. No. 7,812,094, which is herein incorporated by reference.

Multilayer Structures and Method for Forming

Multilayer structures of the present invention, in some embodiments, comprise a substrate layer and a coating layer deposited thereon (as described above). The incorporation of the specific masterbatch and high-pressure low density polyethylene blend in the coating layer advantageously provides improved reduction of neck-in during processing which benefits the processability of the structure.

A method for forming a multilayer structure is disclosed. The method comprises (a) providing a high-pressure low density polyethylene (as described above) having a density in the range of from 0.916 g/cm$^3$ to 0.940 g/cm$^3$, a melt index (12) in the range of from 2.0 to 30.0 g/10 min, and less than 0.20 vinyl groups per 1,000 total carbon atoms; (b) providing a masterbatch composition (as described above) comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/cm$^3$ to 0.970 g/cm$^3$, melt index in the range of from 0.01 g/10 min to 100 g/10 min; (c) reacting the high-pressure low density polyethylene with the masterbatch composition to form a polyethylene composition; and (d) extrusion coating the polyethylene composition as a coating layer onto a substrate layer comprising a substrate to form the multilayer structure.

The reacting of the high-pressure low density polyethylene with the masterbatch composition can be carried out in any customary mixing equipment in which the polymer is melted and mixed with the masterbatch. Suitable equipment is known to those skilled in the art, including for example, mixers, kneaders, and extruders. In some embodiments, the reacting of the high-pressure low density polyethylene with the free radical generator takes place in an extruder. The extruder may further be attached to a blown-film or cast film line. In some embodiments, the reacting of the high-pressure low density polyethylene with the free radical generator takes place in an extruder attached to a blown-film or cast film line.

Exemplary extruder or kneader equipment includes, for example, single-screw extruders, contra-rotating and co-rotating twin-screw extruders, planetary-gear extruders, ring extruders, or co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN. 3-446-14339-4 (Vol 2 Extrusionsanlagen 1986, ISBN 3-446-14329-7). In embodiments herein, the screw length can range from 1-60 times the screw diameter, or 35-48 times the screw diameters. The rotational speed of the screw may range from 10-600 rotations per minute (rpm), or 25-300 rpm. The maximum throughput is dependent on the screw diameter, the rotational speed, and the driving force. The process of the present invention can also be carried out at a level lower than maximum throughput by varying the parameters mentioned or employing weighing machines delivering dosage amounts.

The high-pressure low density polyethylene and the masterbatch may be reacted at a ratio of 60:40 to 99.9:0.1. All individual values and subranges are included and disclosed herein. For example, in some embodiments, the high-pressure low density polyethylene and the masterbatch may be reacted at a ratio of 65:35 to 99.9:0.1, 65:35 to 99.9:0.1, 70:30 to 99.9:0.1, 75:25 to 99.9:0.1, 80:20 to 99.9:0.1, 85:15 to 99.9:0.1, 90:10 to 99.9:0.1, 95:5 to 99.9:0.1, 97:3 to 99.9:0.1, 95:5 to 99:1, or 97:3 to 99:1. The high-pressure low density polyethylene and masterbatch may also be reacted such that the amount of masterbatch in the high-pressure low density polyethylene ranges from 0.1 to 40 wt. %. All individual values and subranges are included and disclosed herein. For example, in some embodiments, the high-pressure low density polyethylene and the masterbatch may be reacted such that the amount of masterbatch in the first polyethylene resin ranges from 0.1 to 35 wt. %, 0.1 to 30 wt. %, 0.1 to 25 wt. %, 0.1 to 20 wt. %, 0.1 to 15 wt. %, 0.1 to 10 wt. %, 0.1 to 5 wt. %, 0.1 to 3 wt. %, 1 to 5 wt. %, or 1 to 3 wt. %.

The high-pressure low density polyethylene and masterbatch are subjected to a temperature above the softening point of the polymers for a sufficient period of time such that the reaction between the high-pressure low density polyethylene and the free radical generator can take place. In some embodiments, the high-pressure low density polyethylene and masterbatch are subjected to a temperature of less than or equal to 280° C. All individual values and subranges from less than or equal to 280° C. are included herein and disclosed herein. For example, the temperature can be less than or equal to 280, 260, 250, 240, 220, 200, 180 or 160° C. In some embodiments, the temperature is from 120° C. to 280° C., 140° C. to 280° C., 160° C. to 280° C., 180° C. to 280° C., or 180° C. to 260° C. In an alternative embodiment, the temperature is from 200° C. to 260° C. It will be understood that the period of time necessary for reaction can vary as a function of the temperature, the amount of material to be reacted, and the type of equipment used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 20 seconds, 30 seconds, 1 minute, 5 minutes, 15, minutes or 25 minutes to an upper limit of 45 seconds, 3 minutes, 8 minutes, 10 minutes, 12 minutes, 15 minutes, 18 minutes, 20 minutes, 23 minutes, or 30 minutes. For example, the time can be in the range of from 10 seconds to 20 minutes, or in the alternative, the time can be in the range of from 10 seconds to 15 minutes, or in the alternative, the time can be in the range of from 10 seconds to 10 minutes, or in the alternative, the time can be in the range of from 20 seconds to 20 minutes, or in the alternative, the time can be in the range of from 15 minutes to 30 minutes.

In embodiments, the method comprises (a) providing a high-pressure low density polyethylene (as described above) having a density in the range of from 0.916 g/cm$^3$ to 0.940 g/cm$^3$, a melt index ($I_2$) in the range of from 2.0 to 30.0 g/10 min, and less than 0.20 vinyl groups per 1,000 total carbon atoms; (b) providing a masterbatch composition (as described above) comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 $g/cm^3$ to 0.970 $g/cm^3$, melt index in the range of from 0.01 g/10 min to 100 g/10 min; (c) reacting the high-pressure low density polyethylene with the masterbatch composition to form a polyethylene composition; and (d) extrusion coating the polyethylene composition as a coating layer onto a substrate layer comprising a substrate to form the multilayer structure, wherein during extrusion coating of the polyethylene composition as the coating layer, the coating layer has a neck-in at 440 feet per minute of less than 4.00 inches, or alternatively less than 3.50 inches, or alternatively less than 3.00 inches, or alternatively less than 2.50 inches.

In embodiments, the method comprises (a) providing a high-pressure low density polyethylene (as described above) having a density in the range of from 0.916 $g/cm^3$ to 0.940 $g/cm^3$, a melt index ($I_2$) in the range of from 2.0 to 30.0 g/10 min, and less than 0.20 vinyl groups per 1,000 total carbon atoms; (b) providing a masterbatch composition (as described above) comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 $g/cm^3$ to 0.970 $g/cm^3$, melt index in the range of from 0.01 g/10 min to 100 g/10 min; (c) reacting the high-pressure low density polyethylene with the masterbatch composition to form a polyethylene composition; and (d) extrusion coating the polyethylene composition as a coating layer onto a substrate layer comprising a substrate to form the multilayer structure, wherein during extrusion coating of the polyethylene composition as the coating layer, the coating layer has a neck-in at 880 feet per minute of less than 3.50 inches, or alternatively less than 3.00 inches, or alternatively less than 2.50 inches.

Articles

Multilayer structures of the present invention can be used to form articles such as packages. Such articles can be formed from any of the multilayer structures described herein.

Examples of articles that can be formed from multilayer structures of the present invention can include flexible packages, pouches, stand-up pouches, and pre-made packages or pouches. In some embodiments, multilayer structures or articles of the present invention can be used for industrial packages. Such articles can be formed using techniques known to those of skill in the art based on the teachings herein and based on the particular use for the package.

Test Methods

Unless otherwise indicated herein, the following analytical methods are used in describing aspects of the present invention:

Density

Density is measured in accordance with ASTM D792, and expressed in grams per cubic centimeter ($g/cm^3$).

Melt Index ($I_2$)

Melt index, or $I_2$, is measured according to ASTM D1238 at 190° C., 2.16 kg.

Vinyl Unsaturation

The samples were prepared by adding ~130 mg of sample to 3.25 g of 50/50 by weight Tetrachlorethane-d2/Perchloroethylene with 0.001 M Cr(AcAc)3 in a Norell 1001-7 10 mm NMR tube. The samples were purged by bubbling nitrogen through the solvent via a pipette inserted into the tube for approximately 5 minutes, capped, sealed with Teflon tape and then soaked at room temperature overnight to facilitate sample dissolution. The samples were heated and vortexed at 115° C. to ensure homogeneity.

1H NMR was performed on a Bruker AVANCE 400 MHz spectrometer equipped with a Bruker Dual DUL high-temperature CryoProbe and a sample temperature of 120° C. Two experiments were run to obtain spectra, a control spectrum to quantitate the total polymer protons, and a double presaturation experiment, which suppresses the intense polymer backbone peaks and enables high sensitivity spectra for quantitation of the end-groups. The control was run with ZG pulse, 4 scans, AQ 1.64 s, D1 (relaxation delay) 14 s. The double presaturation experiment was run with a modified pulse sequence, 100 scans, DS 4, AQ 1.64 s, D1 (presaturation time) 1 s, D13 (relaxation delay) 13s. The region between 4.95 to 5.15 ppm was integrated to determine vinyl content.

Half-Life

The thermal decomposition of different free radical generators (FRGs), as a 10% w/w solution in $C_{20}H_{42}$ (eicosane), was investigated with a SensysEvo DSC instrument (Setaram, France) both under isothermal conditions and the temperature scanning mode. In order to obtain the rate law (kinetic parameters) of the thermal decomposition of the FRGs, the 10% w/w solutions of the FRG in $C_{20}H_{42}$ (eicosane) were measured under temperature scanning mode in the temperature interval from 75° C. to 350° C. at five different scanning rates, namely 1° C./min, 2.5° C./min, 5° C./min, 10° C./min, and 20° C./min, respectively. About 60 mg of sample (the 10% w/w of the FRG in eicosane) was loaded into 170 mL Al pans and placed into the DSC instrument at 75° C. (above the melting point of paraffin) under a nitrogen atmosphere (20 cc/min). After thermal equilibration, the temperature was scanned according to the above-mentioned temperature program and the thermograms were recorded. Exothermic peaks were recorded in the temperature intervals from 120° C. to 320° C. The amount of heat released, −ΔHr (J/g), is determined from the DSC curves for each specimen, which allows for calculation of the reaction progress/conversion with temperature. The kinetic parameters describing the decomposition rate law were determined both by isoconversional methods (using the AKTS Thermokinetic Software, AKTS AG, Switzerland) and the best fitting parameters according to the Sestak-Berggren autocatalytic model. The activation energy, $E_a$ (kJ/mol), and the apparent pre-exponential factor, In A(α)·f (α) ($s^{-1}$(−)) as a function of decomposition progress, α, are determined using the Friedman differential isoconversional method and the Ozawa integral isoconversional method. The general form of Sestak-Berggren equation is given below:

$$\frac{d\alpha}{dt} = A \cdot \exp\ -E_a/RT^{\alpha m}(1-\alpha)^n$$

and the activation energy, $E_a$, the pre-exponential factor, A, and the reaction orders, m and n, in the above equation are determined by the best fitting method. The $E_a$, A, m, and n parameters can then be used to calculate the FRG half-life at any temperature using the AKTS Thermokinetic Software.

Decomposition Energy & Peak Decomposition Temperature

Differential Scanning calorimetry (DSC) was used to measure the decomposition energies and peak decomposition temperatures. The TA Instruments Q2000 DSC, equipped with an RCS (refrigerated cooling system) was used to perform this analysis. A 0.5-2 mg sample was placed in a glass capillary tube, weighed, and flame sealed under nitrogen while being kept cool using a "cold finger" device. Analysis was then performed to determine its thermal properties.

The thermal behavior of the sample was determined by ramping the sample temperature up to create a heat flow versus temperature profile. First, the sample was heated from 0° C. to 400° C., at a rate of 10° C./min. Next, the sample was cooled. The sample was then heated again (this is the "reheat" ramp) at a 10° C./minute heating rate. Both heating curves were recorded. The initial heat curve was analyzed by setting baseline points from the beginning to the end of thermal activity. The reheat was used to assist in the determination of integration start and end.

For the free radical generators, the peak temperature was recorded as well as the total decomposition energy by integration of the area between the curve of the first heat cycle and the baseline. If the decomposition is exothermic, then the area between the curve and the baseline is integrated as negative due to the fact that there is negative heat flow. That is, the sample generates heat. If the sample is endothermic such that it takes heat, then the area is integrated as a positive number.

The heat under the exotherm peak was divided by the purity to extrapolate to 100% pure radical generator.

High Temperature Gel Permeation Chromatography (HT-GPC)

A PolymerChar (Valencia, Spain) high temperature Gel Permeation Chromatography system consisting of an infrared concentration detector (IR-5) is used for MW and MWD determination. The solvent delivery pump, the on-line solvent degas device, auto-sampler, and column oven are from Agilent. The column compartment and detector compartment are operated at 150° C. The columns are three PLgel 10 μm Mixed-B, columns (Agilent). The carrier solvent is 1,2,4-trichlorobenzene (TCB) with a flow rate of 1.0 mL/min. Both solvent sources for chromatographic and sample preparation contained 250 ppm of butylated hydroxytoluene (BHT) and are nitrogen sparged. Polyethylene samples are prepared at targeted polymer concentrations of 2 mg/mL by dissolving in TCB at 160° C. for 3 hour on the auto-sampler just prior the injection. The injection volume is 200 μL.

Calibration of the GPC column set is performed with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene}=A(M_{polystyrene})^B \tag{1}$$

Here B has a value of 1.0, and the experimentally determined value of A is around 0.42.

A third order polynomial is used to fit the respective polyethylene-equivalent calibration points obtained from equation (1) to their observed elution volumes. The actual polynomial fit is obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum^{i} Wf_i}{\sum^{i}\left(\frac{Wf_i}{M_i}\right)} \tag{2}$$

$$\overline{Mw} = \frac{\sum^{i} (Wf_i * M_i)}{\sum^{i} Wf_i} \tag{3}$$

$$\overline{Mz} = \frac{\sum^{i} (Wf_i * M_i^2)}{\sum^{i} (Wf_i * M_i)} \tag{4}$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value is determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Neck-In

Neck-in is measured and reported as the difference between the web width at the exit of the die and the coating layer width after formation of the coated substrate. The reduction in the width is the neck-in and is reported in inches.

Drawdown

Drawdown is reported as the speed at which the web can be drawn before it breaks. To measure drawdown, the speed of the line is increased until the web breaks, and the speed at the time in which the web breaks is reported as the drawdown in feet per minute (fpm).

EXAMPLES

The following examples illustrate features of the present disclosure but are not intended to limit the scope of the disclosure. The following materials are used in the Examples.

TABLE 1

| Resin* | Type | Melt Index ($I_2$) (g/10 min) | Density (g/cm$^3$) | Vinyls per 1000 carbon atoms |
|---|---|---|---|---|
| DOW ™ LDPE 722 | LDPE | 8.0 | 0.918 | 0.030 |
| AGILITY ™ EC 7000 | LDPE | 3.9 | 0.919 | 0.058 |
| AGILITY ™ EC 7030 | LDPE | 2.5 | 0.918 | NM** |
| AGILITY ™ EC 7080 | LDPE | 8.0 | 0.918 | 0.060 |
| ELITE ™ 5815 | LLDPE | 15.0 | 0.910 | NM** |

*All resins in Table 1 are commercially available from The Dow Chemical Company (Midland, MI).
**Not measured = NM In addition to the high-pressure low density polyethylene and linear low density polyethylene polymers in Table 1, a masterbatch composition, DOWLEX™ GM AX01, is used. DOWLEX™ GM AX01 is commercially available from The Dow Chemical Company (Midland, MI). DOWLEX™ GM AX01 comprises a free radical generator (cyclic peroxide) and a polyethylene resin. The free radical generator has a half-life at 220° C. of 82 seconds, a decomposition energy of −835 (kJ/mol), molecular weight of 264.3 Daltons, and a peak decomposition temperature of 208° C. The polyethylene resin of the masterbatch composition has a density of 0.920 g/cm$^3$ and melt index ($I_2$) of 16 g/10 min. The free radical generator is added at an amount of 1,000 ppm to total amount of polyethylene resin for forming the masterbatch composition.

An extrusion coating blend study is carried out to identify neck-in reduction by blending the high-pressure low density polyethylene or linear low density polymers in Table 1 with the masterbatch composition, DOWLEX™ GM AX01 ("MB"), and coating this blend onto 50 pound multiwall brown Kraft paper (a substrate layer comprising a substrate). The Inventive Examples (Inv. Ex.) and Comparable Examples (Comp. Ex.) are provided below in Table 2 and each include a specific amount of the LDPE and MB blended and extrusion coated onto 50 pound multiwall brown Kraft paper.

The extrusion coating trials are performed using a Black-Clawson line following conventional coating procedures. Monolayer coatings are extruded using a 3-layer EC line and using only the primary 3.5 inch diameter extruder (30:1 L/D) powered by a 150 HP Eurotherm drive. The primary barrel consists of 6 heater zones with a temperature profile A1-16=180/230/285/315/315/315° C. A 36 inch Nordson 36 inch Autoflex VI LH40 EPC Die with internal deckle Edge Bead Reduction is used and a 0.5-0.6 mm (0.020") die gap and 153 mm (6") air gap are set. The line is equipped with a 30" chill roll, nip roll, backing roll, and shear slitter. Extrusion coating runs are performed at 25 gsm at 600° C. (or 315° C.), 90 RPM screw speed and 250 lbs/h, 24" die width, 20 mil die gap, which translates into a coating thickness of 1 mil at 440 ft/min onto 50 pound multiwall brown Kraft paper.

TABLE 2

Inventive and Comparative Examples

| Example | LDPE or LLDPE | Masterbatch (MB) |
|---|---|---|
| Comp. Ex. 1 | 100 wt. % DOW ™ LDPE 722 | 0 wt. % MB |
| Comp. Ex. 2 | 100 wt. % AGILITY ™ EC 7000 | 0 wt. % MB |
| Comp. Ex. 3 | 100 wt. % AGILITY ™ EC 7030 | 0 wt. % MB |
| Comp. Ex. 4 | 100 wt. % AGILITY ™ EC 7080 | 0 wt. % MB |
| Comp. Ex. 5 | 98 wt. % ELITE ™ 5815 | 2 wt. % MB |
| Comp. Ex. 6 | 96 wt. % ELITE ™ 5815 | 4 wt. % MB |
| Inv. Ex. 1 | 98 wt. % DOW ™ LDPE 722 | 2 wt. % MB |
| Inv. Ex. 2 | 96 wt. % DOW ™ LDPE 722 | 4 wt. % MB |
| Inv. Ex. 3 | 98 wt. % AGILITY ™ EC 7000 | 2 wt. % MB |
| Inv. Ex. 4 | 96 wt. % AGILITY ™ EC 7000 | 4 wt. % MB |
| Inv. Ex. 5 | 98 wt. % AGILITY ™ EC 7030 | 2 wt. % MB |
| Inv. Ex. 6 | 96 wt. % AGILITY ™ EC 7030 | 4 wt. % MB |
| Inv. Ex. 7 | 98 wt. % AGILITY ™ EC 7080 | 2 wt. % MB |
| Inv. Ex. 8 | 96 wt. % AGILITY ™ EC 7080 | 4 wt. % MB |

During the extrusion coating of coating layer (i.e., the blend of LLDPE or LDPE and MB) onto the substrate layer (Kraft paper), the neck-in and drawdown of the coating layer are measured in accordance with the test method described above. Table 3 below provides the results.

TABLE 3

| Example | Neck-In at 440 fpm (inches) | Neck-In at 880 fpm (inches) | Drawdown (fpm) |
|---|---|---|---|
| Comp. Ex. 1 | 2.13 | 2.13 | 1056 |
| Comp. Ex. 2 | 2.38 | 2.25 | 1438 |
| Comp. Ex. 3 | 2.25 | 2.25 | 1043 |
| Comp. Ex. 4 | 4.25 | 3.50 | >1500* |
| Comp. Ex. 5 | 6.75 | 8.00 | >1500* |
| Comp. Ex. 6 | 7.00 | 7.00 | >1500* |
| Inv. Ex. 1 | 2.00 | 2.00 | 1042 |
| Inv. Ex. 2 | 1.75 | 1.75 | 980 |
| Inv. Ex. 3 | 2.25 | 2.00 | 1400 |
| Inv. Ex. 4 | 2.00 | 2.00 | 1357 |
| Inv. Ex. 5 | 2.13 | 2.00 | 1100 |
| Inv. Ex. 6 | 2.00 | 2.00 | 900 |
| Inv. Ex. 7 | 3.50 | 3.00 | >1500* |
| Inv. Ex. 8 | 3.00 | 2.75 | >1500* |

*Max line rate to measure drawdown.

As can be seen in Table 3, Comparative Examples 1~4 represent five different high-pressure low density polyethylenes that are commonly used in extrusion coating and when the MB composition is added (Inventive Examples 1-8) and the blend is extrude onto the substrate, there is a reduction in neck-in and a maintained or improved drawdown. Comparative Examples 5 and 6 include an LLDPE and adding the MB composition to the LLDPE did not improve neck-in during processing.

We claim:

1. A multilayer structure comprising:

(a) a substrate layer comprising a substrate; and (b) a coating layer comprising a polyethylene composition that comprises:

(i) 90 to 99.5 weight percent, based on the total weight of the polyethylene composition, of a high-pressure low density polyethylene having a density in the range of from 0.916 g/cm$^3$ to 0.940 g/cm$^3$, a melt index (12) in the range of from 2.0 to 30.0 g/10 min, and less than 0.08 vinyl groups per 1,000 total carbon atoms; and (ii) 0.5 to 10 weight percent, based on the total weight of the polyethylene composition, of a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/cm$^3$ to 0.970 g/cm$^3$, melt index in the range of from 0.01 g/10 min to 100 g/10 min, wherein the amount of free radical generator is 5 to 1,000 ppm relative to the total amount of polyethylene resin;

wherein the substrate layer is coated with the coating layer.

2. The multilayer structure of claim 1, wherein the amount of free radical generator is less than 100 ppm relative to the total amount of polyethylene resin.

3. The multilayer structure of claim 1, wherein the free radical generator has a half-life at 220° C. of between 60 seconds and 120 seconds.

4. The multilayer structure of claim 1, wherein the molecular weight of the free radical generator is from 200 to 1,000 Daltons.

5. The multilayer structure of claim 1, wherein the free radical generator is a cyclic peroxide.

6. The multilayer structure of claim 1, wherein the substrate of the substrate layer comprises at least one of a film, nonwoven, woven, scrim, foil, carpet, plastic, saran, paper, cellulose, or metal.

7. A method for forming a multilayer structure, the method comprising:

(a) providing a high-pressure low density polyethylene having a density in the range of from 0.916 g/cm$^3$ to 0.940 g/cm$^3$, a melt index ($I_2$) in the range of from 2.0 to 30.0 g/10 min, and less than 0.08 vinyl groups per 1,000 total carbon atoms;

(b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density in the range of from 0.900 g/cm$^3$ to 0.970 g/cm$^3$, melt index in the range of from 0.01 g/10 min to 100 g/10 min;

(c) reacting the high-pressure low density polyethylene with the masterbatch composition to form a polyethylene composition; and (d) extrusion coating the polyethylene composition as a coating layer onto a substrate layer comprising a substrate to form the multilayer structure, wherein the high-pressure low density polyethylene is 90 to 99.5 weight percent based on the total amount of polyethylene resin, the masterbatch composition is 0.5 to 10 weight percent based on the total amount of polyethylene resin, and the amount of free radical generator is 5 to 1,000 ppm relative to the total amount of polyethylene resin.

8. The method of claim 7, wherein during extrusion coating of the polyethylene composition as the coating layer, the coating layer has a neck-in at 440 feet per minute of less than 4.00 inches.

9. The method of claim 7, wherein during extrusion coating of the polyethylene composition as the coating layer, the coating layer has a neck-in at 880 feet per minute of less than 3.50 inches.

* * * * *